United States Patent
Agrawal

(10) Patent No.: US 10,572,934 B2
(45) Date of Patent: Feb. 25, 2020

(54) METHOD FOR MAKING A TRANSACTION

(71) Applicant: MASTERCARD INTERNATIONAL INCORPORATED, Purchase, NY (US)

(72) Inventor: Rahul Agrawal, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 210 days.

(21) Appl. No.: 15/678,366

(22) Filed: Aug. 16, 2017

(65) Prior Publication Data
US 2018/0053242 A1   Feb. 22, 2018

(30) Foreign Application Priority Data

Aug. 18, 2016  (SG) .......................... 10201606880R

(51) Int. Cl.
| | |
|---|---|
| *G06Q 30/06* | (2012.01) |
| *G06Q 20/32* | (2012.01) |
| *G06Q 20/12* | (2012.01) |
| *G06K 7/10* | (2006.01) |
| *G06Q 20/20* | (2012.01) |

(Continued)

(52) U.S. Cl.
CPC ..... *G06Q 30/0641* (2013.01); *G06K 7/10554* (2013.01); *G06Q 20/12* (2013.01); *G06Q 20/202* (2013.01); *G06Q 20/32* (2013.01); *G06Q 20/40145* (2013.01); *G06Q 30/0633* (2013.01); *H04L 9/3231* (2013.01)

(58) Field of Classification Search
USPC .......................................................... 705/21
See application file for complete search history.

(56) References Cited

U.S. PATENT DOCUMENTS

| | | | |
|---|---|---|---|
| 2009/0228362 A1* | 9/2009 | Lapsley ................ | G01F 19/005 705/44 |
| 2011/0251910 A1 | 10/2011 | Dimmick | |

(Continued)

FOREIGN PATENT DOCUMENTS

WO    2016025190 A1    2/2016

OTHER PUBLICATIONS

International Search Report and Written Opinion for corresponding PCT Application No. PCT/US17/043656 dated Oct. 13, 2017.

*Primary Examiner* — Garcia Ade
(74) *Attorney, Agent, or Firm* — Budzyn IP Law, LLC

(57) ABSTRACT

In one aspect, a method is provided for making a transaction, the method including receiving, at a merchant system: a basket for purchase; and a unique code identifying a user. The method also includes reading, using the merchant system, one or more biomarkers from the user and identifying, from a database, a stored code corresponding to the unique code and one or more stored biomarkers corresponding to the one or more biomarkers. The method further compares: the one or more biomarkers with the one or more stored biomarkers associated with the corresponding stored code; or, the unique code with the stored code associated with the one or more stored biomarkers. If there is a match, a transaction based on the basket for purchase is made using a payment vehicle associated with the corresponding stored code; or, if there is no match, the transaction is declined.

9 Claims, 7 Drawing Sheets

(51) Int. Cl.
    *G06Q 20/40*    (2012.01)
    *H04L 9/32*     (2006.01)

(56) References Cited

U.S. PATENT DOCUMENTS

| 2015/0127475 A1* | 5/2015 | Mushing | G06Q 20/40145 |
| | | | 705/16 |
| 2015/0254662 A1 | 9/2015 | Radu | |
| 2015/0363785 A1 | 12/2015 | Perez et al. | |

* cited by examiner

FIG. 3 Flow Diagram: When customer do online transaction at e-Commerce Site

METHOD FOR MAKING A TRANSACTION

TECHNICAL FIELD

The present disclosure relates to a method for making a transaction.

BACKGROUND

Electronic transactions are becoming increasingly common. Often, the customer making the transaction is not known to the merchant. Consequently, proxies for the identity of the customer are used to verify their identity. These proxies typically rely on information assumed to be available only to the customer, such as a personal identification number (PIN), a code delivered in a text message to the customer's smartphone or details provided on the customer's payment vehicle (e.g. a credit or debit card). The proxies do not verify the identity of the customer but instead verify that the customer has access to the particular information used as the proxy for their identity.

As a result, a stolen payment vehicle can readily be used by somebody other than the cardholder—in other words, a person other than the entity for whom was established the credit or debit facility attaching to the card. This is because many transactions use only the information available on the stolen payment vehicle. For example, an online transaction using a credit card will often require only the details visible on the front and rear surfaces of the card to be inputted into a payment gateway.

In addition, if a customer wishes to change their payment vehicle—for example, they change credit card provider or obtain a new credit card—that customer is issued with a new card number and new physical card. Financial institutions therefore need to maintain inventories of physical cards.

It would be useful to provide a mechanism by which financial transactions can be affected, without requiring a physical payment vehicle to be present, and without assuming the exclusive access to particular information (e.g. the proxies for the customer's identity) of the owner of the payment vehicle (e.g. cardholder).

SUMMARY

The present disclosure provides a method for making a transaction, comprising:
  receiving, at a merchant system:
    a basket for purchase; and
    a unique code identifying a user;
  reading, using the merchant system, one or more biomarkers from the user;
  identifying, from a database comprising a plurality of stored codes each being associated with one or more stored biomarkers and a payment vehicle, one of a stored code corresponding to the unique code and one or more stored biomarkers corresponding to the one or more biomarkers;
  comparing:
    where the stored code is identified, the one or more biomarkers with the one or more stored biomarkers associated with the corresponding stored code; or
    where the one or more stored biomarkers is identified, the unique code with the stored code associated with the one or more stored biomarkers,
  to determine whether there is a match; and
    if there is a match, making the transaction using the payment vehicle associated with the corresponding stored code; or
    if there is not a match, declining the transaction.

Also disclosed herein is a system for making a transaction, the system comprising:
  a merchant system;
  a biomarker server;
  a mapping server,
  each of the merchant system, biomarker server and mapping server comprising:
    a memory device for storing data; and
    a processor coupled to the memory device,
  the processor of the merchant system being coupled to the corresponding memory device and being configured to:
    receive a basket for purchase and a unique code identifying a user; and
    read one or more biomarkers from the user;
  wherein the memory device of the biomarker server comprises a plurality of stored codes each being associated with one or more stored biomarkers, and the processor of the biomarker server is coupled to the memory device of the biomarker server and is configured to:
    identify, from the memory device of the biomarker server one of a stored code corresponding to the unique code and one or more stored biomarkers corresponding to the one or more biomarkers;
    compare:
      where the stored code is identified, the one or more biomarkers with the one or more stored biomarkers associated with the corresponding stored code; or
      where the one or more stored biomarkers is identified, the unique code with the stored code associated with the one or more stored biomarkers,
    to determine whether there is a match,
  wherein the memory of the mapping server comprises the plurality of stored codes and/or the one or more stored biomarkers stored in association with a respective payment vehicle, the processor of the mapping server being coupled to the memory of the mapping server and being configured to identify one of a stored code corresponding to the unique code and one or more stored biomarkers corresponding to the one or more biomarkers, the system being configured to make the transaction using the payment vehicle associated with the corresponding stored code or one or more biomarkers if there is a match identified by the mapping server, or decline the transaction if no match is identified by the mapping server.

BRIEF DESCRIPTION OF THE DRAWINGS

Some non-limiting embodiments will now be described with reference to the accompanying drawings in which.

DETAILED DESCRIPTION

Figure 1:
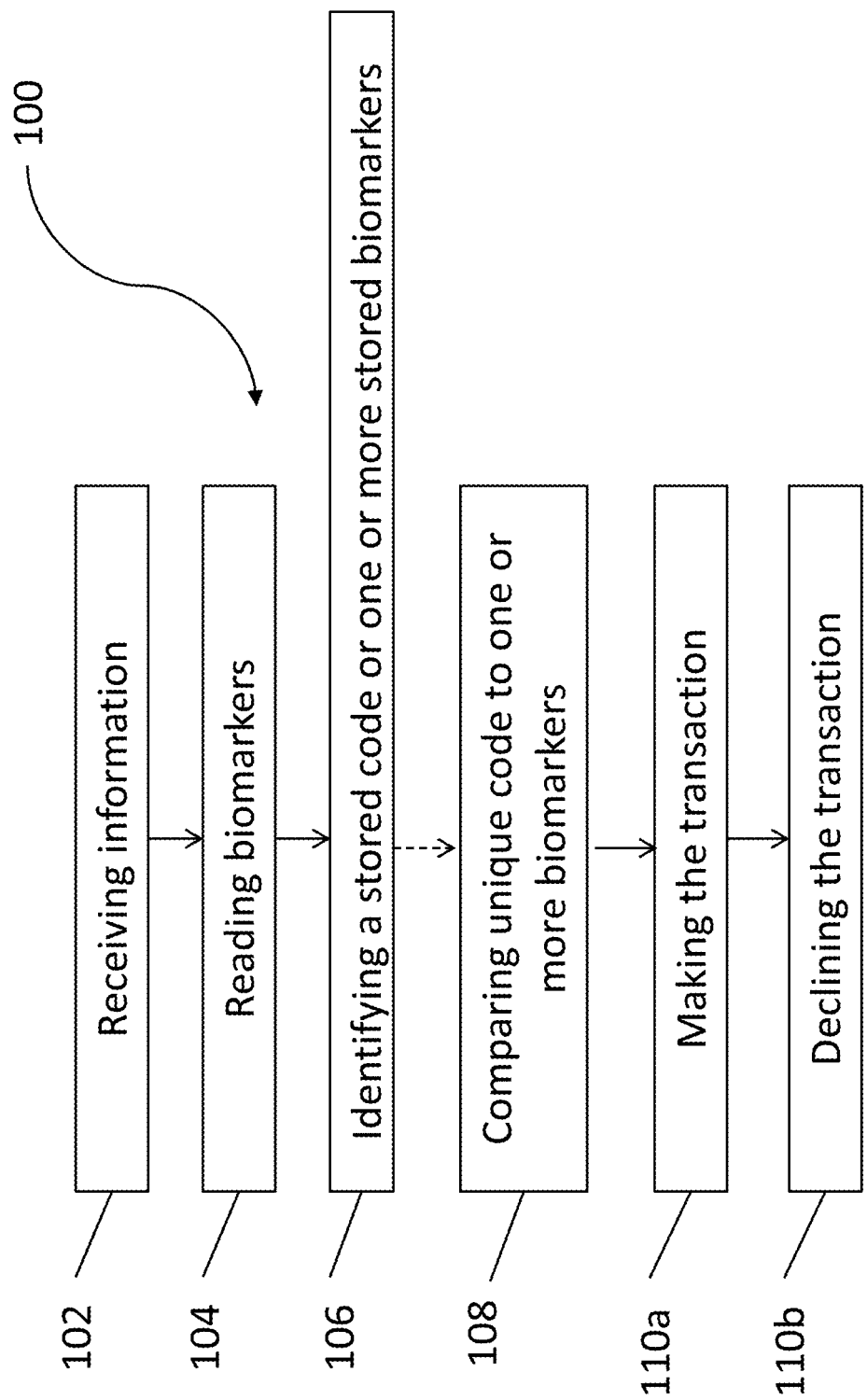
FIG. 1 shows a computer-implemented method or process, in accordance with one embodiment of the invention, for making a transaction.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1 illustrates a method 100 for making a transaction, in accordance with an embodiment of the present teachings. The method 100 broadly comprises:

Step 102: receiving information;
Step 104: reading biomarkers;
Step 106: identifying a stored code or one or more stored biomarkers;
Step 108: comparing unique code or one or more biomarkers with stored code or one or more stored biomarkers; and
Step 110a: making the transaction; or
Step 110b: declining the transaction.

Step 102 involves receiving information on which the financial transaction can be based. The information is received at a merchant system and includes:

a basket for purchase; and
a unique code identifying a user.

The basket is also sometimes referred to as a shopping trolley or shopping cart. The basket is the goods and/or services a customer desires to purchase.

The unique code is any code a merchant system can be configured to collect—in this sense a merchant terminal or system may be a point-of-sale (POS) terminal and associated hardware and software, or a personal computer displaying a payment gateway accessible through a merchant website. The code may be a tax file number, Aadhaar number, a national personal identification number (e.g. driver's licence number) or any other number or string of characters uniquely differentiate a particular customer from all other customers. The unique code may be, for example, a social security number entered into a keypad on an appropriately configured POS terminal. The merchant system may also receive the unique code from a portable device, such as the customer's smartphone. To that end the merchant system may be automatically paired (e.g. using NFC technology) to the portable electronic device in a known manner.

The manner in which the information is received will be discussed with reference to FIGS. 2 and 3.

Step 104 comprises using the merchant system to read one or more biomarkers from a person making the transaction. Where the merchant system comprises a POS terminal, that POS terminal may comprise or be connected to a biomarker reader, such as a fingerprint or iris scanner, used for reading a fingerprint or the iris of the customer. That POS terminal may also be connected to a portable electronic device, such as the customer's smartphone, from which the unique code and/or the one or more biomarkers are received. All such equipment to which a POS terminal or other merchant terminal is connected are considered part of the merchant system.

It will be understood that a single biomarker may be read, or two or more biomarkers as may be required in order to properly identify the customer.

Step 106 involves searching a database in which the unique codes of multiple customers, or people in general, are stored in association with one or more biomarkers for each respective person. The unique codes and/or one or more biomarkers are also stored in association with a payment vehicle.

The search tries to identify a stored code or one or more stored biomarkers (i.e. stored in the database) that correspond to the unique code or the one or more biomarkers read from the customer.

Step 108 involves comparing codes or biomarkers to codes or biomarkers stored in the database. Where the unique code is used in step 106 to identify a corresponding stored code, the one or more biomarkers are then compared to one or more stored biomarkers to determine whether there is a match. For many biomarker comparisons, such as fingerprint and iris comparisons, a match is found where the fingerprint or iris as read by the merchant system comprises a set of key features that are represented in the respective stored biomarker—in this sense a stored biomarker may comprise a vector or array of data elements representative of the features sought to be identified in the biomarker, such as a unique set of characteristics distinguishing one fingerprint over all other fingerprints.

Alternatively, where the one or more biomarkers are used in step 106, based on the relevant set of key features of those biomarkers that are extracted during reading in step 104, to identify a corresponding one or more stored biomarkers the database, the unique code is compared against the corresponding stored code to determine whether there is a match.

To perform step 108, the unique code and one or more biomarkers are mapped to a stored code and a corresponding one or more stored biomarkers of the same individual (i.e. person) to determine whether the unique code matches the one or more biomarkers. The two will match if the stored code and one or more stored biomarkers with which they correspond are associated with the same customer or person.

The payment vehicle associated with the stored code and one or more stored biomarkers can then be used in performing the transaction to purchase the basket. Using this process the payment vehicle details are never used by the customer directly with the merchant. Security of those details is therefore enhanced.

The payment vehicle is also associated with funds that can be used to make the transaction. Therefore, once a match is identified at step 108, the transaction is made using the payment vehicle associated with the corresponding stored code—step 10a. If a match is not identified at step 108, the transaction is declined—step 10b. It should be noted that making the transaction does not mean it is successfully settled. Instead, the usual process of determining whether there are insufficient available funds associated with the payment vehicle, and processing or declining the transaction accordingly, can still take place.

The database mentioned in relation to steps 106 and 108 may comprise a single database or multiple databases distributed across a network. For example, a first database may comprise a plurality of stored codes corresponding to the unique codes of the customers, each stored code being associated with one or more stored biomarkers corresponding to the one or more biomarkers of the respective customer. A second database may then comprise one or more payments vehicles (i.e. payment vehicle details such as credit or debit card number, expiry date, CVV, etc) stored in association one or both of the stored codes and one or more biomarkers. The second database can therefore be used to map a code or biomarker to a payment vehicle for use in transactions.

Figure 2:
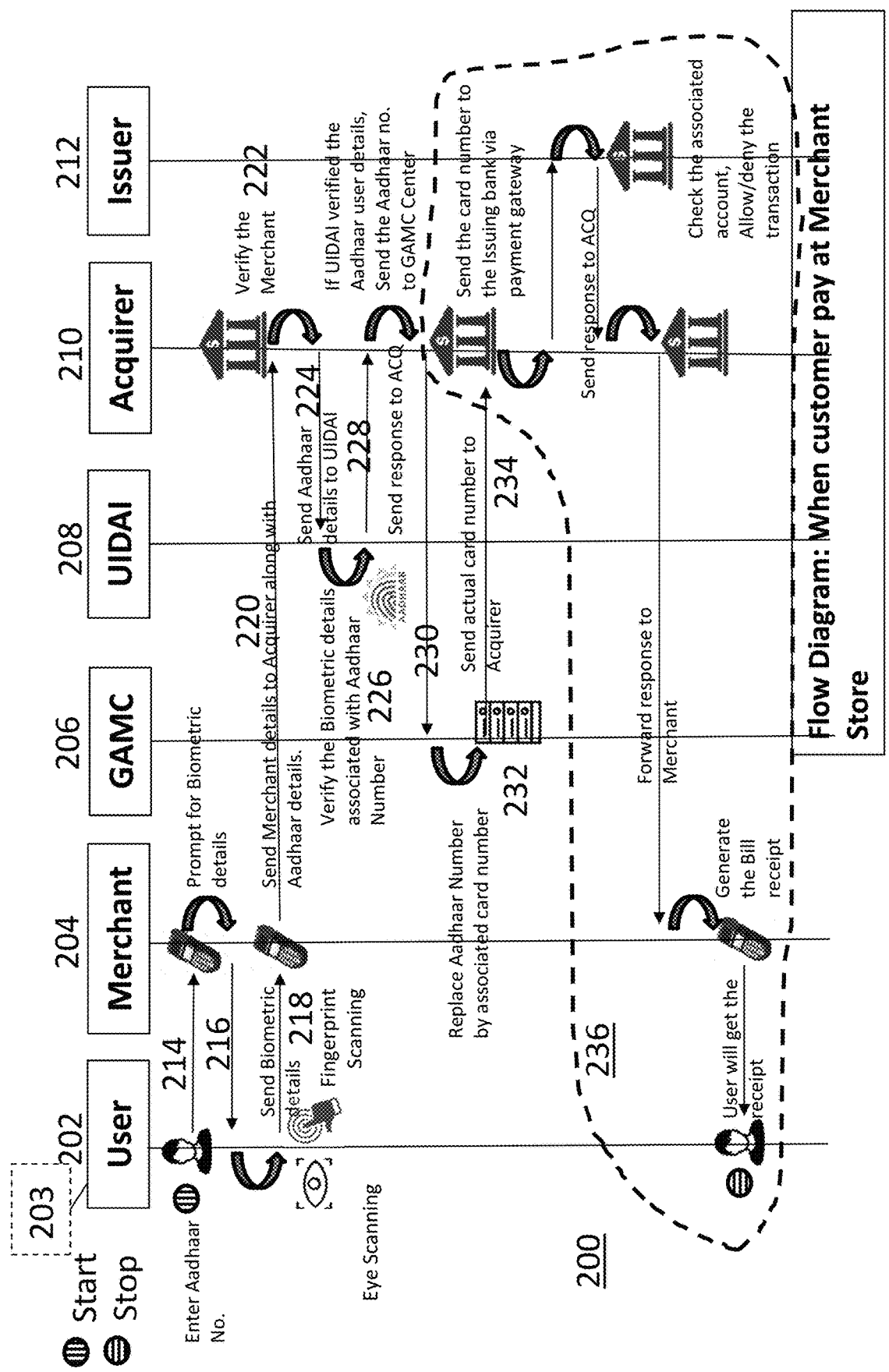
FIG. 2 is a flow diagram illustrating a performance of an embodiment of the method of FIG. 1 for in-store transactions.

Accordingly, as may be necessary for the implementation of the process flow 200 of FIG. 2, the stored codes, one or more stored biomarkers and respective payment vehicle (i.e. payment vehicle details such as credit card number, expiry and CVV) may be distributed across multiple databases. Where they are distributed they will be linked by a common data element, such as the unique code which is equivalent to a corresponding unique stored code.

With further reference to FIG. 2, process flow 200 illustrates performance of the method 100 broadly described by FIG. 1, in an in-store purchase context. The process involves multiple parties including:

client 202;
merchant 204;
mapping server 206;
biomarker server 208;
acquirer 210; and
issuer 212.

For in-store purchases, the client 202 may be a client terminal such as a smartphone or other portable electronic device held by a customer. The smartphone may deliver the unique code and/or the one or more biomarkers to the merchant 204. The client 202 may instead be a human customer 203 who enters the unique code and one or more biomarkers into the merchant 204, where the merchant 204 is embodied by a merchant terminal (e.g. POS terminal). The client 202 and merchant 204 may also comprise a common terminal (e.g. the client 202 and merchant 204 may be the same terminal where a customer is using a kiosk or other electronic device through which purchases from the merchant can be made). In any case, the client 202 either is, or is associated with, the customer making the purchase transaction with a merchant associated with the merchant terminal 204.

Where the client is a client terminal 202 and the merchant is a merchant terminal 204, the portable device may employ near-field communication (NFC) to pair and communicate with the merchant terminal 304 thereby to automatically deliver the unique code without that code being visible to third parties in the vicinity of the merchant terminal 204. This may occur where the client terminal 202 is a smartphone and the merchant terminal 204 is a POS terminal with NFC functionality. While the client terminal 202 may concurrently deliver the unique code and the one or more biomarkers to the merchant terminal 204, thereby combining steps 214, 216 and 218 discussed below, the present embodiment employs steps 214, 216 and 218 separately.

The merchant in the present embodiment comprises a merchant terminal 204 such as a POS terminal. The merchant terminal 204 is configured to receive the unique code. For example, the merchant terminal may be configured to pair (e.g. using NFC or other RFID technology) to the client 202 to automatically receive the unique code from the client terminal 202 upon confirmation from the user of the client terminal 202 that the unique code should be sent. Alternatively, the unique code may alternatively be entered using an interface such as a touchscreen or keyboard.

The unique code may serve to replace the number of the credit or debit card a user might otherwise have used for the transaction through the merchant 204. Accordingly, the credit or debit card may no longer be required.

The merchant terminal 204 is also configured to receive the one or more biomarkers. Again, the merchant terminal 204 may receive these from the client terminal 202, and thus the client terminal 202 is configured to read the one or more biomarkers and send the one or more biomarkers to the merchant terminal 204 using NFC or other appropriate technology. In either case, the client terminal 202 or the merchant terminal 204 is configured to read the one or more biomarkers such as by providing a fingerprint scanner for scanning a fingerprint of a customer, an iris scanner for scanning an iris of the customer or other biomarker reader as will be useable in the present methods to uniquely identify a particular customer.

The mapping server 206 maps the unique code and/or the one or more biomarkers to a payment vehicle for use in the transaction between the customer, associated with the client 202, and merchant 204.

In this case, biomarkers and unique codes are mapped separately from mapping either of those pieces of information to payment vehicle details. The step of checking whether the unique code matches the one or more biomarkers is performed by a biomarker server 208. In other embodiments, mapping server 206 and biomarker server 208 will comprise part of the same server or system of servers.

The role of the acquirer and issuer in financial systems is well established. While they may pass new information here (i.e. biomarker information and unique codes), resulting in new functionality, the general functions performed by these parties will be known.

With reference to the process flow 200 between the parties, 202, 204, 206, 208, 210 and 212, upon collection of a basket for purchase a customer proceeds to checkout. At step 214, the customer or client 202 enters the unique code into the merchant terminal 204. The merchant terminal 204 responds by prompting the client 202 for biometric information 216. The prompt may be a display on a screen at the merchant terminal 204 advising the client 202 they are to provide biometric information—i.e. to provide a reading of a biomarker or to present a fingerprint or iris for scanning. Where the client 202 comprises a smartphone or other portable device, the prompt may be in the form of a request for that information from the portable device. The portable device may then automatically supply that information where it has such information stored in memory, or may request the user to present relevant biomarkers for reading—e.g. present a fingerprint or iris to a fingerprint or iris scanner. It is noted that automatically supplying biomarker information from stored representations of that information is insecure since theft of a persons' smartphone or other portable device may enable absolute theft of that person's identity and control of their accounts. Therefore, the prompt from the merchant 204 may result in the client 202 requesting the customer to scan their fingerprint or iris or the client 202 (e.g. fingerprint reader on a smartphone), which results in the scanned fingerprint or iris being sent to the merchant 204. In any case, at step 218, the one or more biomarkers (i.e. information representing the one or more biomarkers) are provided to the merchant terminal 204.

In the context of the present teachings, the phrase "scanned biomarker", "scanned fingerprint or iris", and similar phrases, will be understood to mean that data representative of the scanned fingerprint or iris is sent.

At step 220, transaction data is sent from the merchant terminal 204 to the acquirer 210. The transaction data comprises data necessary to confirm the identity of the user, identify a payment vehicle for use in the transaction (i.e. the purchase of the basket) and to affect settlement. To that end, the transaction data comprises at least the basket, the unique code, the one or more biomarkers and a merchant identifier. The merchant identifier identifies the merchant from whom the basket is being purchased, so the acquirer knows with whom to settle the transaction with the customer.

The acquirer 210 then verifies the merchant at step 222. In other words, the acquirer 210 confirms the merchant with whom the merchant terminal 204 is associated is in fact registered with that acquirer 210. This process is in common use in electronic transactions and need not be described further.

At this stage, the identity of the customer 203 is still unverified. To facilitate verification, the acquirer 210 sends the unique code and one or more biomarkers to the biomarker server 208, at step 224. The biomarker server 208 then confirms the unique code matches the one or more biomarkers, at step 226 which is equivalent to 108 of FIG. 1. If confirmation is not given, the transaction is declined. If the biomarker server 208 confirms the unique code matches the one or more biomarkers then it verifies the customer 203 (i.e. confirms the customer is the person they assert to be) to the acquirer 210 at step 228.

Upon receipt of verification of the customer 203 the acquirer 210 requests payment vehicle details from the mapping server 206, the payment vehicle details being the details of a payment vehicle to be used in purchasing the basket—step 230. At step 232, the mapping server 206 maps the unique code or one or more biomarkers to a payment vehicle. In other words, the mapping server 206 is associated with a database in which payment vehicle details are stored in association with respective unique codes and/or biomarkers. When a request for payment vehicle details is received, along with a unique code or one or more biomarkers, the mapping server 206 identifies the payment vehicle associated with the unique code or one or more biomarkers. At step 234, the details of the payment vehicle are returned to the acquirer 210.

As all the usual information—merchant identifier, payment vehicle details and basket details—are now known to the acquirer 210, the acquirer 210 can process settlement with the issuer 212 and merchant associated with merchant terminal 204 in the usual manner that will be understood by the skilled person. To that end, the remaining steps are collectively referenced by numeral 236.

Figure 3:
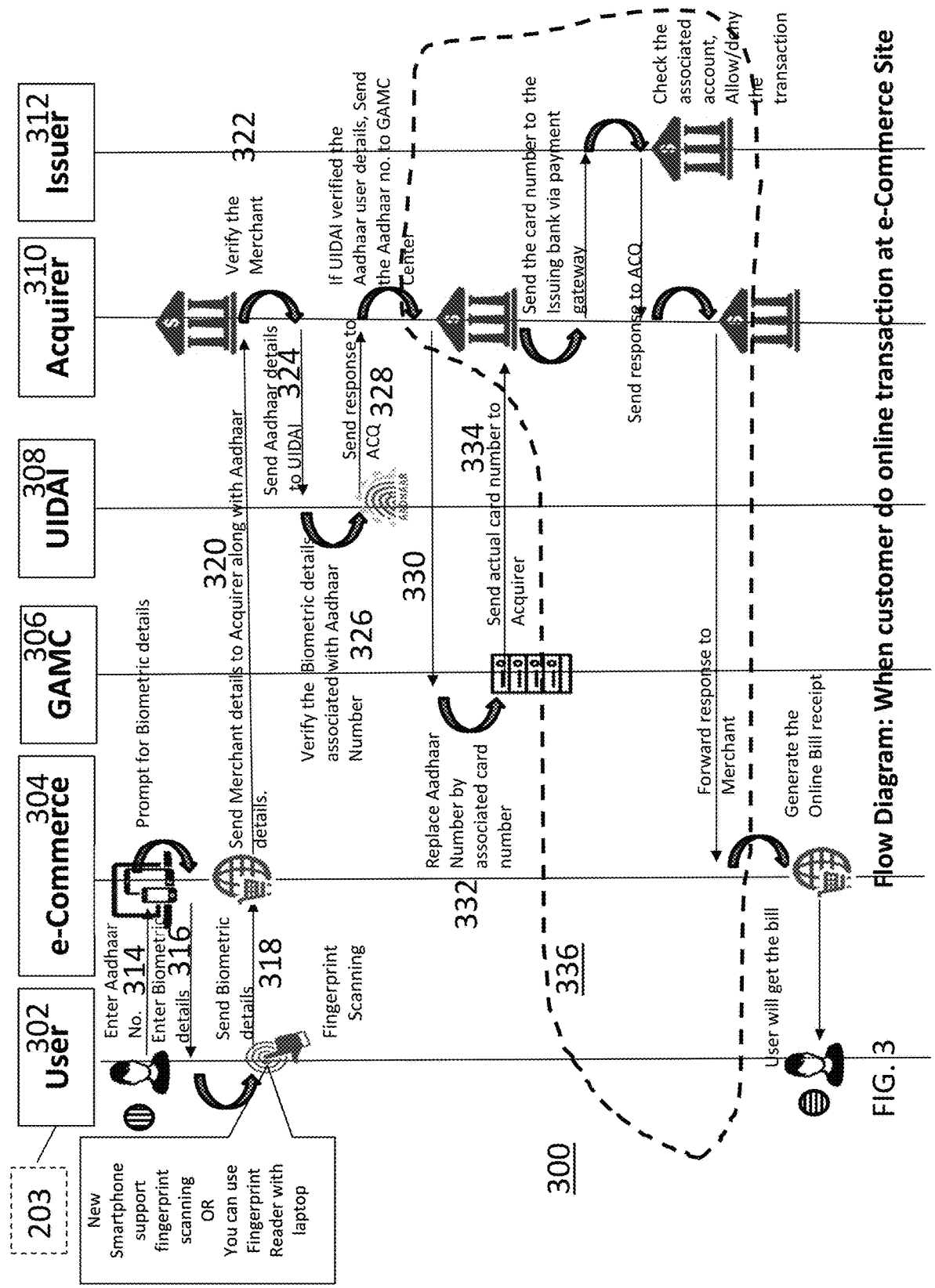
FIG. 3 is a flow diagram illustrating a performance of an embodiment of the method of FIG. 1 for online transactions.

FIG. 3 illustrates a process flow 300 for performing the method 100 broadly described by FIG. 1, in an online purchase context. The process involves multiple parties including:

client 302;
merchant 304;
mapping server 306;
biomarker server 308;
acquirer 310; and
issuer 312.

Each of parties 306, 308, 310 and 312 is the same as its counterpart in FIG. 2. In the present embodiment, the client 302 comprises a client terminal through which the transaction is being made, and the merchant 304 comprises an online merchant with whom the transaction is being made. The merchant terminal 304 may comprise a payment gateway or other mechanisms required to facilitate electronic payment.

The customer 303 electronically selects items for purchase and thereby assembles their basket before proceeding to checkout. At checkout the customer 303 enters their unique code (e.g. through a button or touchscreen interface) instead of payment vehicle details. The merchant terminal 304 thus receives the unique code at step 314. While the one or more biomarkers may then automatically be supplied as mentioned with reference to FIG. 1, in the present embodiment the merchant terminal prompts the customer 303 for provision of the one or more biomarkers, at step 316—notably, the one or more biomarkers may be supplied in advance of the unique code and this alternative embodiment is intended to remain within the scope of the present disclosure. In order to provide the one or more biomarkers, the client terminal 302 must be equipped with or connected to the requisite biomarker reader, such as a fingerprint scanner or iris scanner, through which to read the one or more biomarkers. Once read, the one or more biomarkers are sent to the merchant terminal 304, at step 318, and the process flow 300 proceeds in the same manner as process flow 200.

Figure 4:
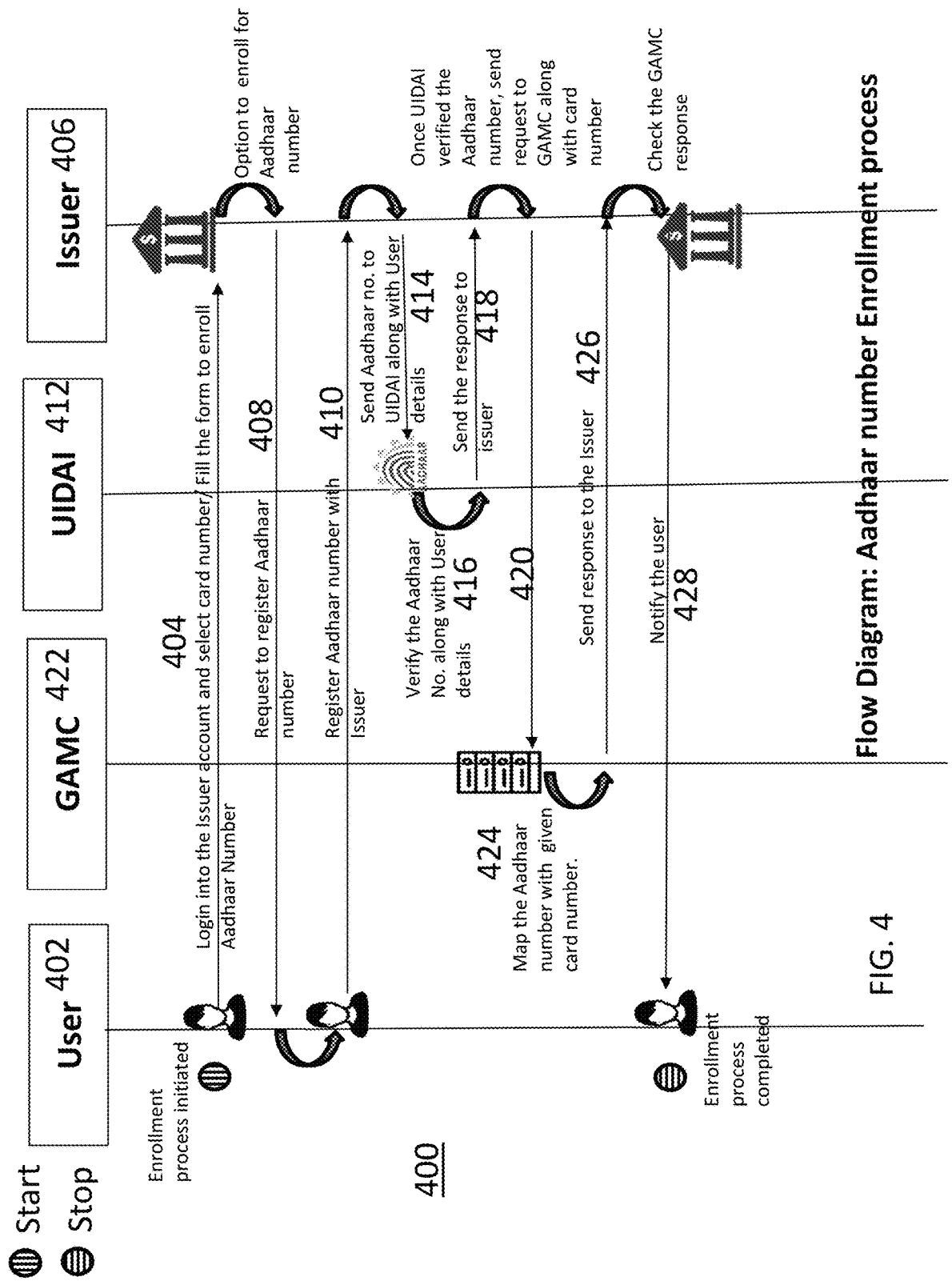
FIG. 4 is a flow diagram illustrating an enrolment process for enrolling to make financial transactions using the method of FIG. 1.

FIG. 4 shows the process 400 for registration of a customer 402 for use with method 100 and process flows 200 and 300. Enrolment is intended to enable purchases to be performed at multiple merchants. The merchant, therefore, is not present is the registration process 400.

Since the unique code may comprise an Aadhaar number, social security number, tax file number or other number unique to an individual, registration for the unique code may be performed independently of the process for mapping the payment vehicle details to the unique code and/or one or more biomarkers. FIG. 4 shows an embodiment where the unique code is generated separately from the process for mapping payment vehicle details to that unique code. It particular, in the process 400 it is assumed the user has been assigned a relevant unique code.

At step 404, the customer 402 selects one or more payment vehicles for association with the unique code. This selection may be made by accessing the website or mobile app of the issuer of the payment vehicle, or of the acquirer through whom the payment vehicle was acquired. In the present embodiment that selection is made through the website or mobile app of the issuer 406. After selection, the issuer 406 confirms the request to associate a particular payment vehicle, or particular payment vehicles, with the unique code, at step 408.

The user 402 then confirms their desire to register the unique code in association with the payment vehicle or payment vehicles, at step 410. Notably, by requesting registration of a unique code and associated payment vehicle or payment vehicles at step 404, it may be assumed that the request is confirmed—since it would otherwise not have been requested—and thus bypass steps 408 and 410.

Upon confirmation of the user's desire to register the unique code and associated one or more payment vehicles, the issuer 406 sends the unique code and details of the user 402 to the biomarker server 412, at step 414. The biomarker server 412 verifies the unique code, at step 416, by locating the unique code in a database associated with server 412, and confirming that unique code is associated with user details the same as those forwarded by the issuer 406.

If the unique code and user details match, the biomarker server 412 sends confirmation to the issuer 406 at step 418 (i.e. confirms the user's identity). If the unique code and user details do not match, then the biomarker server 412 declines the request for registration and the process 400 exits unsuccessfully.

Upon confirmation from the biomarker server 412, the issuer 406 knows the unique code is correctly associated with the user 402. The issuer 406 then sends a request, at step 420, to the mapping server 422 to map the unique code to the relevant payment vehicle or payment vehicles. Alternatively, or in addition, the issuer 406 may receive the one or more biomarkers from the biomarker server 412 along with the confirmation, at step 418. Thus the issuer 406 can request that the mapping server 422 associate the one or more biomarkers with one or both of the unique code and the payment vehicle or vehicles.

The mapping server 422 stores the payment vehicle details of each payment vehicle in association with one or both of the unique code and one or more biomarkers, at step 424. Thus the mapping server 422 can retrieve the requisite payment vehicle details upon receipt of the relevant one or both of the unique code and one or more biomarkers, by mapping the received information to the payment vehicle details with which that information is associated.

Upon successful recordation of the payment vehicle details with one or both of the unique code and one or more biomarkers, the mapping server 422 sends confirmation to the issuer 406, at step 426, and the issuer 406 notifies the user 402, at step 428, that they are now free to use their unique code and one or more biomarkers in place of physical debit or credit cards, or the details of those cards, when making transactions.

Figure 5:
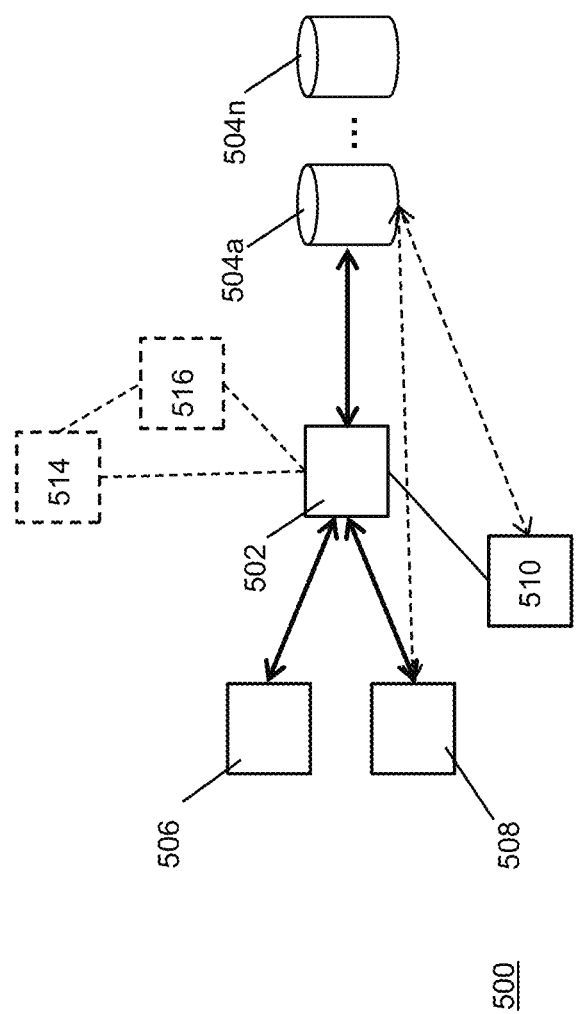
FIG. 5 shows a schematic of a system for performing the method of FIG. 1.

FIG. 5 shows a schematic of a network-based system 500 for making a transaction according to an embodiment of the invention. The system 500 comprises a computer 502 (e.g. an acquirer's server), a mapping server 508, a biomarker server 510, one or more databases 504a . . . 504n and a user input module 506. Each of the one or more databases 504a . . . 504n are communicatively coupled with the computer 502 and servers 508, 510—notably, one or more databases 504a . . . 504n may be exclusively connected to only one of the computer 502, server 508 and server 510. The computer 502, server 508 and server 510 may be separate units, or one of the computer 502, server 508 and server 510 may be integrally formed with one or both of the other of those units. The user input module 506 may be a mobile electronic device (e.g. a mobile phone, a tablet computer, etc.). The mobile electronic device may have appropriate communication modules for wireless communication with the computer 502 via various communication protocols. The system 500 further includes an issuer server 514 through which settlement is processed—notably, there may be additional intervening parties such as the payment scheme 516, or the acquirer or payment scheme may also be the issuer, and all such variations on settlement processes are envisioned to operate in conjunction with the teachings provided herein.

The user input module 506 may comprise the client terminal 202, or may alternatively comprise the merchant terminal or server 204. Where the user input module 506 comprises the merchant terminal 204, a customer may interact with the merchant terminal either directly (e.g. for in-store purchases) or indirectly (e.g. for online purchases). For indirect interaction the system 500 may further include a client terminal 512 (shown in FIG. 5 in broken lines as it may not be incorporated into all embodiments) communicatively coupled with the merchant terminal 504.

The system 500 may comprise: at least one processor; and at least one memory including computer program code; the at least one memory and the computer program code configured to, with at least one processor, cause the system 500 to perform a method for making a transaction at least in that the system 500 will: (A) receive, at a merchant system 506: a basket for purchase; and a unique code identifying a user; (B) read, using the merchant system 506 or client 512, one or more biomarkers from the user; (C) identify, from a database 504a . . . 504n comprising a plurality of stored codes each being associated with one or more stored biomarkers and a payment vehicle, one of a stored code corresponding to the unique code and one or more stored biomarkers corresponding to the one or more biomarkers; (D) compare: (D1) where the stored code is identified, the one or more biomarkers with the one or more stored biomarkers associated with the corresponding stored code; or (D2) where the one or more stored biomarkers is identified, the unique code with the stored code associated with the one or more stored biomarkers, to determine whether there is a match; and; (E1) if there is a match, making the transaction using the payment vehicle associated with the corresponding stored code; or (E2) if there is not a match, declining the transaction.

In an implementation, the system 500 may be caused to perform step (C) by sending the unique code and one or more biomarkers from the merchant terminal 506 to an acquirer 502; and forwarding the unique code and one or more biomarkers from the acquirer 502 to a secure personal information management facility (e.g. comprising biomarker server 510 and mapping server 508) at which the comparing step is performed.

The system 500 may further be caused to send a confirmation message from the secure personal information management facility (510, 508) to the acquirer 502 confirming the unique code corresponds to the user, if the secure personal information management facility (510, 508) determines the one or more biomarkers match the one or more stored biomarkers.

The computer 502 may be caused to perform step (E1) by forwarding one of the unique code and corresponding stored code, which may be the same code, to a mapper (i.e. mapping server 508), the mapper mapping the respective code to the payment vehicle, and settling the transaction using payment vehicle details of the payment vehicle.

In some embodiments (e.g. where the merchant terminal comprises a point-of-sale (POS) terminal), the merchant terminal 506 may be caused to receive the basket for purchase by scanning a barcode of one or more products using a scanner of the POS terminal. In other embodiments (e.g. where the merchant terminal comprises a virtual terminal accessed by the user through a mobile device), the merchant terminal 504 may be caused to receive the basket for purchase by receiving an online selection of one or more products. In embodiments where the mobile device comprises a smartphone, the merchant terminal 506 may be caused to receive an online selection of one or more products by receiving selection of one or more products through an interface of the smartphone.

The various types of data, e.g. basket, unique code, one or more biomarkers, plurality of stored codes, payment vehicle details and one or more stored biomarkers, can be stored on a single database (e.g. 504*a*), or stored in multiple databases (e.g. payment vehicle details (which may include a digital wallet comprising one or more credit or debit cards) are stored on database 504*a*, stored codes are stored on database 504*n*, etc.). The databases 504*a* . . . 504*n* may be realized using cloud computing storage modules and/or dedicated servers communicatively coupled with the computer 502.

Figure 6:
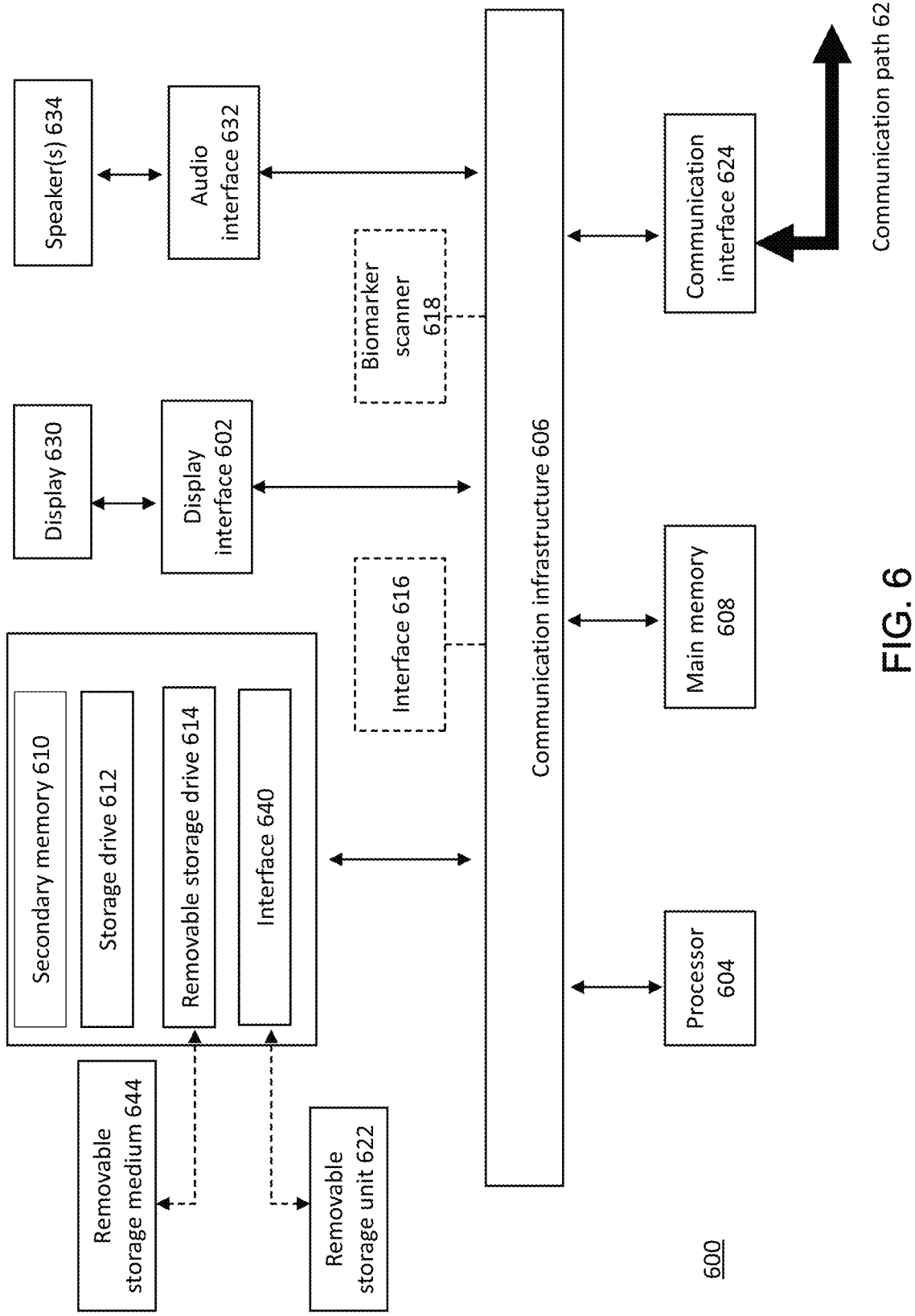
FIG. 6 shows an exemplary computing device suitable for executing the method of FIG. 1.

FIG. 6 depicts an exemplary computer/computing device 600, hereinafter interchangeably referred to as a computer system 600, where one or more such computing devices 600 may be used to facilitate execution of the above-described method for making a transaction. For example, the issuer server may comprise one such computer 600, as may each of the mapping server and the biomarker server. In addition, one or more components of the computer system 600 may be used to realize the computer 502. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 644 in a well-known manner. The removable storage medium 644 may include magnetic tape, optical disk, non-volatile memory storage medium, or the like, which is read by and written to by removable storage drive 614. As will be appreciated by persons skilled in the relevant art(s), the removable storage medium 644 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 640. Examples of a removable storage unit 622 and interface 640 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 640 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the inventions, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1393, RJ45, USB), an antenna with associated circuitry and the like. The communication interface 624 may be wired or may be wireless. Software and data transferred via the communication interface 624 are in the form of signals which can be electronic, electromagnetic, optical or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" may refer, in part, to removable storage medium 644, removable storage unit 622, a hard disk installed in storage drive 612, or a carrier wave carrying software over communication path 626 (wireless link or cable) to communication interface 624. Computer readable storage media refers to any non-transitory, non-volatile tangible storage medium that provides recorded instructions and/or data to the computing device 600 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 640. Alternatively, the computer program product may be downloaded to the computer system 600 over the communications path 626. The software, when executed by the processor 604, causes the computing device 600 to perform functions of embodiments described herein.

Where computing device 600 comprises a merchant terminal for in-store purchases, or a mobile device for online purchases, the merchant terminal or mobile device may comprise an interface 616 for receiving the unique code, which may be integral with or separate from a biomarker scanner 618 for scanning the one or more biomarkers.

It is to be understood that the embodiment of FIG. 6 is presented merely by way of example. Therefore, in some embodiments one or more features of the computing device 600 may be omitted (e.g. the interface 616 and scanner 618 are shown in broken lines as they may not comprise components of, for example, the issuer server which may similarly be constructed from the components schematically represented by computing device 600 of FIG. 6). Also, in some embodiments, one or more features of the computing device 600 may be combined together. Additionally, in some embodiments, one or more features of the computing device 600 may be split into one or more component parts.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts.

It will be appreciated that the elements illustrated in FIG. 6 function to provide means for performing the computer implemented method as described with respect to FIG. 1. For example, the computing device 600 provides an apparatus for making a transaction, the apparatus comprising: at least one processor 604, at least one memory 608 including computer program code and at least one communication interface 624.

Where apparatus 600 is a merchant system or merchant terminal, the at least one memory 608 and the computer program code are configured to, with at least one processor 604, cause the apparatus at least to: receive a basket for purchase through the communication interface 624 (e.g. barcode scanner) and a unique code identifying a user through interface 616, and read, using the biomarker scanner 618, one or more biomarkers from the user.

Where multiple apparatuses 600 are networked together to provide the functions of the issuer server, mapping server and biomarker server, the at least one memory 608 (which may be shared amongst the servers or comprise a separate memory on each server) and the computer program code are further configured to cause the processors 604 associated with respective ones of the servers to identify, in the case where one of the apparatuses is the biomarker server, from a database comprising a plurality of stored codes each being associated with one or more stored biomarkers, one of a stored code corresponding to the unique code and one or more stored biomarkers corresponding to the one or more biomarkers, and compare: where the stored code is identified, the one or more biomarkers with the one or more stored biomarkers associated with the corresponding stored code; or where the one or more stored biomarkers is identified, the unique code with the stored code associated with the one or more stored biomarkers, to determine whether there is a match.

In the case where an apparatus 600 is the mapping server, the at least one memory 608 and the computer program code are further configured to cause the processors 604 to identify, from a database comprising a plurality of stored codes or one or more stored biomarkers stored in association with respective payment vehicles, a payment vehicle for use in making the transaction.

In the case where an apparatus 600 is the acquirer server, the at least one memory 608 and the computer program code are further configured to cause the processors 604 to make the transaction using the payment vehicle associated with the corresponding stored code, if there is a match between the stored code and one or more stored biomarkers, and the unique code and one or more biomarkers, or decline the transaction if there is no match.

Figure 7:
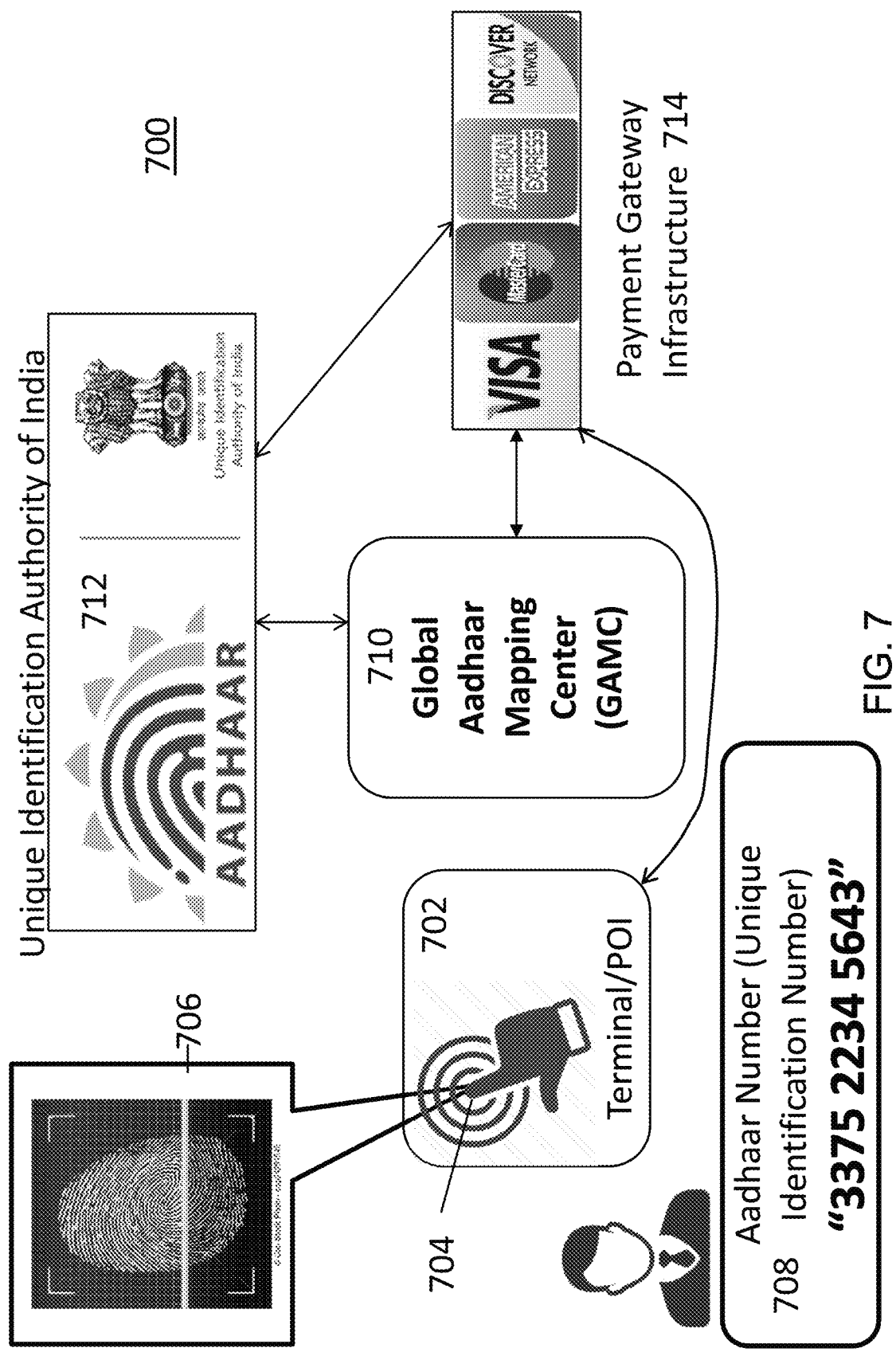
FIG. 7 illustrates the relationship between different entities involved in performance of the method of FIG. 1.

FIG. 7 shows a schematic of a system 700 for implementing the method 100. The system 700 comprises a merchant terminal 702 including a fingerprint scanner 704 for scanning a fingerprint 706. The merchant terminal 702 also receives a unique code from a customer 708. To this end, the unique code may be delivered verbally for entry by the merchant. Alternatively, the unique code may be inputted into a user interface (e.g. touchscreen) or through voice recognition. Notably, where voice recognition is used the recitation of the unique code (which may include any characters and not just numbers), the merchant terminal 702 may record the recitation of the unique code (or other statement by the customer) from which a voice-biomarker can be ascertained as the, or one of the, one or more biomarkers.

Once a basket has been received along with the unique code and one or more biomarkers, the merchant terminal 702 transmits these pieces of information to the various servers including that of the payment gateway 714. The unique code and one or more biomarkers are then sent to the biomarker server 712 for verification of the customer and, after positive verification (i.e. confirmation that the customer is who they assert to be), the payment gateway 714 sends the unique code and/or the one or more biomarkers to the mapping server 710 (which may be accessed via the acquirer server (not shown)). The mapping server 710 retrieves the payment vehicle details for a payment vehicle associated with the unique code and/or one or more biomarkers, and associated with funds for use in purchasing the basket. Once the payment vehicle details are supplied by the mapping server 710 to the payment gateway 714, the payment gateway 714 can affect settlement as discussed with reference to FIGS. 1 to 3.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for verifying a transaction, the system comprising:
   a merchant system;
   a biomarker server;
   a mapping server,
   each of the merchant system, biomarker server and mapping server comprising:
      a memory device for storing data; and
      a processor coupled to the memory device,
   the processor of the merchant system being coupled to the corresponding memory device and being configured to:
      receive a basket for purchase and a unique code identifying a user; and
      read one or more biomarkers from the user;
   wherein the memory device of the biomarker server comprises a plurality of stored codes each being associated with one or more stored biomarkers, and the processor of the biomarker server is coupled to the memory device of the biomarker server and is configured to:
      identify, from the memory device of the biomarker server one of a stored code corresponding to the unique code and one or more stored biomarkers corresponding to the one or more biomarkers;
   compare:
      where the stored code is identified, the one or more biomarkers with the one or more stored biomarkers associated with the corresponding stored code; or
      where the one or more stored biomarkers is identified, the unique code with the stored code associated with the one or more stored biomarkers, to determine whether there is a match,
   wherein the memory of the mapping server comprises the plurality of stored codes and/or the one or more stored biomarkers stored in association with details of a respective payment vehicle, the processor of the mapping server being coupled to the memory of the mapping server and being configured to identify one of a stored code corresponding to the unique code and one or more stored biomarkers corresponding to the one or more biomarkers to identify the associated payment vehicle,
   wherein the system being configured to verify the transaction based on the basket for purchase using the identified associated payment vehicle if there is a match identified by the biomarker server, or decline the transaction if no match is identified by the biomarker server, and
   wherein, in response to the transaction having been verified, the processor of the mapping server is configured to transmit the details of the identified associated payment vehicle to an acquirer for processing of the transaction.

2. A system according to claim 1, being further configured to identify the stored code by:
   sending the unique code and one or more biomarkers from the merchant system to the acquirer; and
   forwarding the unique code and one or more biomarkers from the acquirer to the biomarker server.

3. A system according to claim 2, being further configured to send a confirmation message from the biomarker server to the acquirer confirming the unique code corresponds to the user, if the biomarker server determines the one or more biomarkers match the one or more stored biomarkers.

4. A system according to claim 1, wherein the one or more biomarkers comprise a fingerprint of the user.

5. A system according to claim 1, wherein the one or more biomarkers comprise an iris of the user.

6. A system according to claim 1, wherein the merchant system comprises a point-of-sale (POS) terminal configured to receive the basket for purchase by scanning a barcode of one or more products using a scanner of the POS terminal.

7. A system according to claim 1, wherein the merchant system comprises a virtual terminal accessed by the user through a mobile device and configured to receive the basket for purchase by receiving an online selection of one or more products.

8. A system according to claim 7, wherein a merchant associated with the merchant system is an aggregator.

9. A system according to claim 7, wherein the mobile device comprises a smartphone configured to receive an online selection of one or more products by receiving selection of one or more products through an interface of the smartphone.

* * * * *